United States Patent [19]
Rumez et al.

[11] Patent Number: 5,566,655
[45] Date of Patent: Oct. 22, 1996

[54] METHOD FOR CONTROLLING THE FLOW OF FLUID THROUGH AN INTAKE PIPE OF AN INTERNAL COMBUSTION ENGINE

[75] Inventors: Werner Rumez, Mühlacker; Siegfried Sumser, Sttutgart, both of Germany

[73] Assignee: Daimler-Benz AG, Stuttgart, Germany

[21] Appl. No.: 546,200

[22] Filed: Oct. 20, 1995

[30] Foreign Application Priority Data

Oct. 24, 1994 [DE] Germany .................. 44 37 947.1

[51] Int. Cl.$^6$ .................. F02B 17/00; F02M 25/00
[52] U.S. Cl. .................. 123/306; 123/430; 123/698
[58] Field of Search .................. 123/306, 430, 123/698–700, 429

[56] References Cited

U.S. PATENT DOCUMENTS

| | | | |
|---|---|---|---|
| 3,970,052 | 7/1976 | Andoh | 123/25 R |
| 4,104,989 | 8/1978 | Resler, Jr. | 123/430 |
| 4,519,367 | 5/1985 | Nomura | 123/699 |
| 4,768,485 | 9/1988 | Brandner et al. | 123/698 |
| 5,261,373 | 11/1993 | Ohsuga et al. | 123/430 |

FOREIGN PATENT DOCUMENTS

| | | |
|---|---|---|
| 0105828 | 4/1984 | European Pat. Off. . |
| 0421481 | 4/1991 | European Pat. Off. . |
| 3204842 | 8/1983 | Germany . |
| 3413419 | 10/1984 | Germany . |
| 3500608 | 7/1986 | Germany . |
| 3511094 | 10/1986 | Germany . |
| 3906083 | 8/1990 | Germany . |
| 2177522 | 1/1987 | United Kingdom . |

*Primary Examiner*—Andrew M. Dolinar
*Attorney, Agent, or Firm*—Klaus J. Bach

[57] ABSTRACT

In a method and system for controlling the flow of fluid through the intake duct of an internal combustion engine of which the exhaust gas is measured and its composition compared with values desired for minimum fuel consumption and minimum emission values and the flow of additional fluid supplied to the intake duct is controlled depending on a characteristic diagram, the mass flow and flow profiles are varied depending on the characteristic diagram by controlled injection of the additional flow into the intake duct and by controlled removal of gas from the intake duct.

6 Claims, 1 Drawing Sheet

METHOD FOR CONTROLLING THE FLOW OF FLUID THROUGH AN INTAKE PIPE OF AN INTERNAL COMBUSTION ENGINE

BACKGROUND OF THE INVENTION

The invention relates to a method for controlling the flow of fluid through an intake pipe of an internal combustion engine and to a control system for carrying out the method.

It is known (DE 35 11 094 A1 and DE 34 13 419 C2) to supply additional or exhaust gas streams to the intake manifold of an internal combustion engine of a motor vehicle, in order to decrease the fuel consumption and to reduce the emission of harmful substances from the exhaust system of the motor vehicle. For this purpose, additional feed ducts are integrated into the intake manifold which make it possible to supply the additional fluid to the combustion chamber. The supply of the additional fluid takes place in dependence on the vacuum present in the intake manifold.

The object of the present invention is to provide a method and a control system of the type mentioned above by means of which a further reduction of fuel consumption of, and emissions of harmful substances from, the internal combustion engine can be achieved.

SUMMARY OF THE INVENTION

In a method and system for controlling the supply of additional fluid into, and the removal of fluid from, the intake pipe of an internal combustion engine of which the exhaust gas is measured and its composition compared with values desired for minimum fuel consumption and minimum emission values and the flow of said additional fluid is controlled depending on a characteristic diagram, the mass flow and flow profiles are varied depending on the characteristic diagram by controlled injection of the additional fluid into the intake pipe and by controlled removal of fluid from the intake pipe.

With the method and system according to the invention, it is possible to achieve a uniformly low fuel consumption and a uniformly low emission of harmful substance over all engine speed and load ranges. The fluid flows are adjusted continuously on the basis of the determined exhaust gas values, to which specific actuating signals are assigned. By the electronic control system according to the invention, the supply of additional fluid flows is accurately adjusted according to the particular requirements. This is also true for transient operating conditions such as acceleration procedures.

Further advantages and features of the invention will become apparent from the following description of an exemplary embodiment of the invention described on the basis of the accompanying drawings.

DESCRIPTION OF A PREFERRED EMBODIMENT

Figure 1:
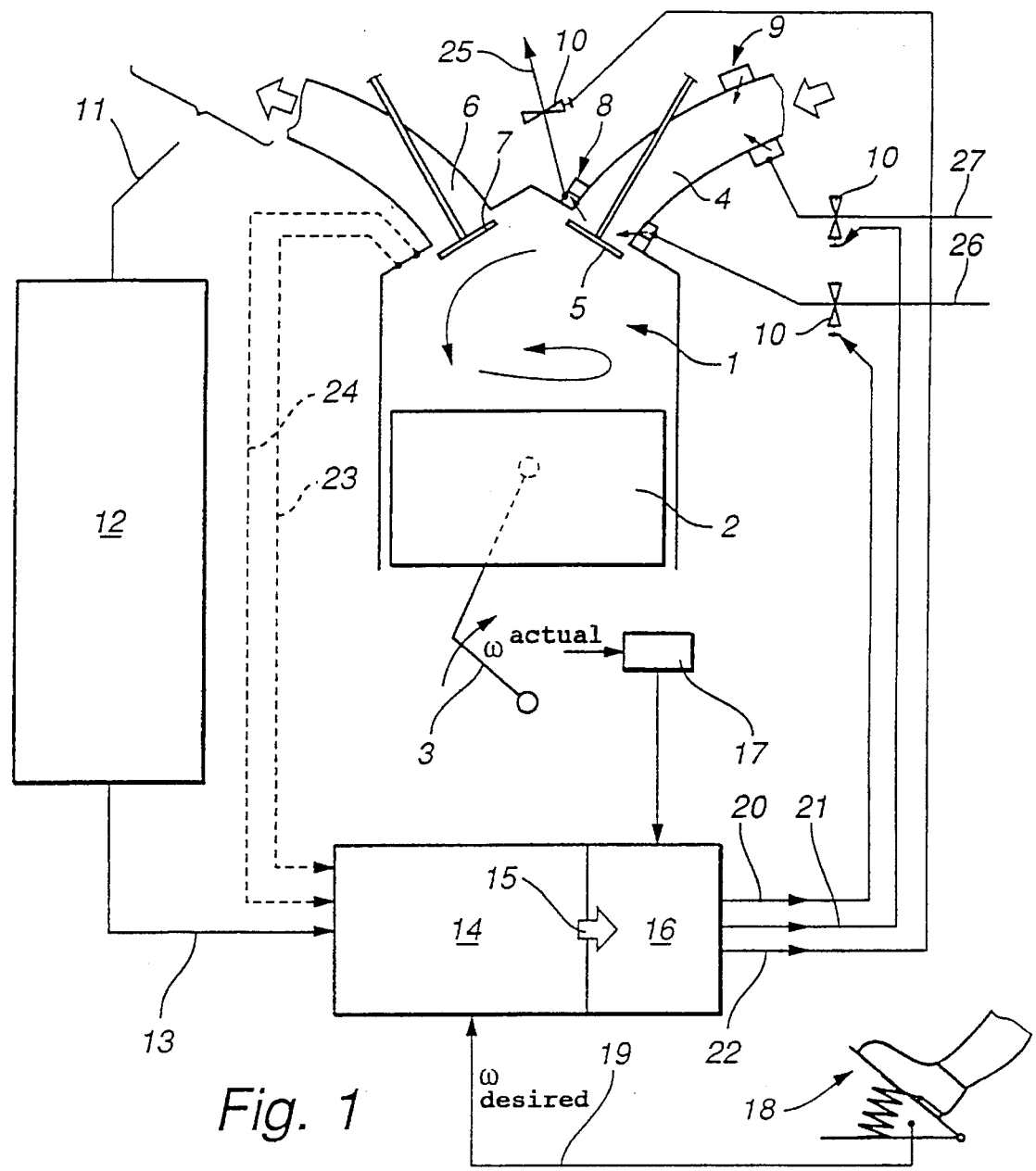
FIG. 1 shows diagrammatically an embodiment of a regulating system according to the invention which is provided for an internal combustion engine of a motor vehicle.

As shown in FIG. 1, a cylinder of an internal combustion engine of a motor vehicle has a combustion chamber 1 above a piston 2. The piston 2 is connected, in a way known per se, to a crankshaft 3 whose rotational speed ($\omega_{actual}$) is sensed by means of a measurement transducer 17. The internal combustion engine has a plurality of cylinders, but only a single cylinder is shown for the sake of clarity. An intake duct 4 is in communication with the combustion chamber 1 under the control of an inlet valve 5. On the outlet side, an exhaust gas tract 6 which is part of an exhaust system is in communication with the combustion chamber 1. The outlet to the exhaust gas tract 6 can be closed by means of an outlet valve 7. Provided in the intake duct 4 are two injector bushings 8 and 9 which serve as feed nozzles for additional fluid streams and which radially surround the intake duct 4 at different points. Thus, the injector bushing 8 is arranged directly adjacent the inlet region of the intake duct into the combustion chamber 1, that is adjacent the intake valve 5, whereas the injector bushing 9 is arranged at an axial distance upstream of the intake valve 5. The two injector bushings 8 and 9 are connected to respective fluid conduits 26, 27 by means of which corresponding additional fluid streams are injected through the injector bushings 8, 9 into the intake duct 4 under excess pressure in relation to the intake duct pressure. Depending on the requirements with regard to minimizing the fuel consumption or the emission of harmful substances, exhaust gas streams, air streams, water streams or fuel streams are fed into the intake duct 4 by way of the fluid conduits 26, 27 as additional fluid streams. Exhaust gas is diverted out of the exhaust gas tract 6 and returned to the intake manifold 4. The flow quantities, that is the mass throughputs, in the fluid conduits 26 27 can be adjusted in each case by means of throttle valves 10.

The injector bushing 8 also has, in addition to a feed nozzle, a suction nozzle, to which a suction conduit 25 is connected. Appropriate fluid streams, such as gas or mixture streams, can be sucked off by means of this suction nozzle. The suction conduit 25 too is provided with a throttle valve 10 for controlling the throughflow quantity and therefore the amount of the sucked-off fluid.

A plurality of exhaust gas sensors which quantitatively analyze the composition of the exhaust gas stream are arranged in the exhaust gas tract 6. Exhaust gas sensors measure the carbon monoxide content, the hydrocarbon content, the emission of nitrogen oxide, benzene content and the soot content. The values recorded by the various exhaust gas sensors are transmitted by means of signal lines 11 to a sensor unit 12 which records the various values of the exhaust gas sensors. The determined exhaust gas values are transmitted from the sensor unit 12 by way of a signal line 13 to a central control unit 14, 15, 16 to which two signal lines 23, 24 for the transmission of pressure and temperature values in the combustion chamber 1 are also connected.

Stored in the central control unit 14, 15, 16 is a characteristic diagram which was determined for the internal combustion engine to achieve minimum fuel consumption and minimum emission of harmful substances. All the ranges of exhaust gas occurring at different engine speeds and combustion chamber states are stored in this characteristic diagram. Each of these values has assigned thereto appropriate control commands for a suitable control of the flow quantities of the additional fluid streams to be added to, or extracted from, the intake duct 4. From a comparison of the values of the characteristic diagram with the instantaneous measured values, the control unit also forms appropriate control commands for transient operations. These control commands are transmitted by means of an actuating device 16, which is an integral part of the central control unit 14, 15, 16, to the various throttle valves 10 of the fluid conduits 26, 27 and of the suction conduit 25. The corresponding actuating lines for transmitting the actuating commands from the actuating device 16 to the various throttle valves 10 are designated by numerals 20, 21, 22. The characteristic diagram 14 is connected to the actuating device 16 by means of a comparison and evaluation unit 15 which compares the measured values arriving by way of the signal line 13 and the signal lines 23, 24 with the respective data of the characteristic diagram and which assigns control commands to these arriving values in conformity with the characteristic diagram. Also connected to the central control unit 14, 15, 16, of course, is a signal line 19 which is operated by an accelerator pedal 18 of the motor vehicle and which sets the appropriate desired speed ($\omega_{desired}$) for the internal combustion engine.

The internal combustion engine is controlled by means of the characteristic diagram 14 and the associated electronics in such a way that its fuel consumption and its emission of harmful substances are reduced as much as possible. Such control is achieved by means of an appropriate reduction, increase or shut-off of the flow quantities of the additional fluid streams in the additional fluid conduits 26, 27 or in the suction conduit 25 as a result of a corresponding activation of the various throttle valves 10.

Figure 2:
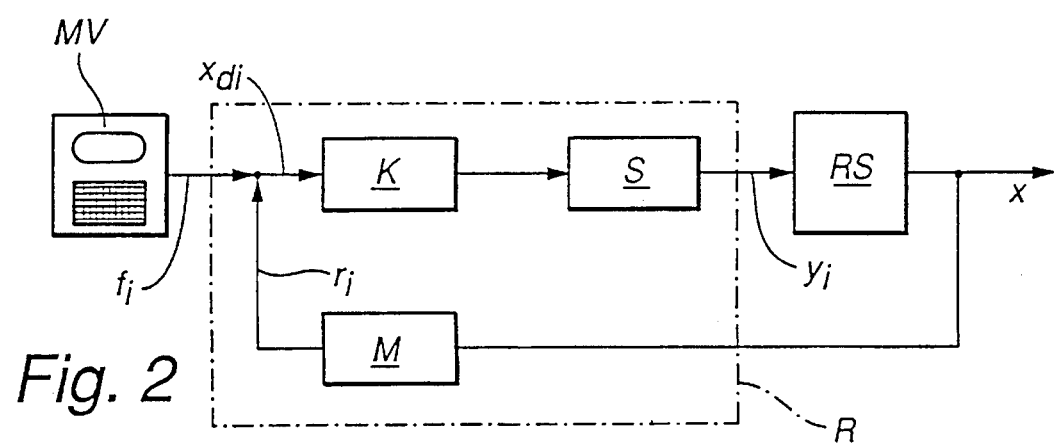
FIG. 2 is a basic diagram of a regulating unit of the regulating system according to FIG. 1.

A regulator R according to FIG. 2 has a correcting device K which is followed by an actuating device S. This actuating device S is connected to the controlled system including the engine as well as various assemblies and devices. Input variables of the controlled system which are transmitted by the actuating device S are actuating variables $y_i$ which define the various additional mass flows for the intake duct. The output variable of the controlled system RS is the control variable x which represents the actual exhaust gas mass flow. In the output region of the controlled system, measuring devices M for the various measured variables to be recorded, such as the pressure in the combustion chamber, the temperature in the combustion chamber, the actual engine speed and the desired speed of the engine according to the accelerator pedal position, are taken into account. They form feedback variables $r_i$ which are combined, ahead of the input of the correcting device K, with the command variables $f_i$ of the minimum setting MV for the emission of harmful substances in the exhaust gas. The regulating differences $x_{di}$ resulting herefrom are fed to the correcting device K which accordingly operates the actuating devices S for the various actuating variables $y_i$. By means of this regulator, the flow past the intake valve disc in the intake duct region is influenced by the variable additional mass flows in such a way that a controlled three dimensional and time related formation of the overall flow structures, such as swirl D and tumble T (FIG. 1), takes place in the combustion chamber. An appropriate control of the additional mass flows makes it possible to achieve in the intake duct an axial, radial and also sectorial stratification which allows a subsequent stratification, that is a desired concentration gradient, in the combustion chamber. Combustion with minimum fuel and minimum generation of harmful substances can thus be achieved. Moreover, the control of the additional fluid mass flows causes, in the intake duct, a gas flow which promotes gas mixture before and during the intake stroke. At the same time, the additional fluid mass flows promote the impulse motion of the fluid column in the intake duct at the start of the intake stroke and improve the filling of the combustion chamber. The regulator settings can be varied in a self-adaptive manner, so that the minimum consumption and minimum exhaust gas emission values can be achieved successively over the entire operating range of the engine.

The control variables which are recorded by means of measuring devices are the nitrogen oxide and hydrocarbon mass flows, and mass flows of other exhaust gas constituents. Actuating variables, by means of which the fluid supply to the intake duct is controlled including the various additional fluid streams, are mass flows of additional air, additional exhaust gas, additional water and additional fuel. An appropriate circumferential distribution of the mass flows by means of the injector bushing makes it possible to influence swirl D and tumble T movements in the combustion chamber.

What is claimed:

1. A method of controlling the flow of fluid through an engine intake duct and past an engine intake valve into an internal combustion engine, from which exhaust gases are discharged into an exhaust pipe of an exhaust system of said engine, said method comprising the steps of: measuring at least one exhaust gas parameter in said exhaust pipe, comparing said measured exhaust gas parameter with at least one parameter of a characteristic diagram developed with a view to achieving minimum fuel consumption and minimum emission of harmful substances of the internal combustion engine, supplying a first additional fluid stream to said intake duct at a location adjacent said intake valve, supplying a second additional fluid stream to said intake duct at a distance upstream of said intake valve, removing fluid from said intake duct at a location adjacent said intake valve, and varying the mass flows and flow profiles of said additional fluid streams in dependence on regulating variables selected by way of said characteristic diagram so as to obtain minimum fuel consumption and minimum emission of harmful substances as measured in said exhaust pipe.

2. A method according to claim 1, wherein said fluid flow past said engine inlet valve is controlled by varying said additional fluid streams into, and out of the intake duct in such a way that a predetermined three dimensional and time dependent overall flow structure is developed in the combustion chamber.

3. A method according to claim 2, wherein the flow profile of each additional fluid stream supplied to the intake duct during the engine intake strokes is a predetermined function which is time dependent on said characteristic diagram.

4. A method according to claim 3, wherein axial, radial, or sectorial flow stratification is provided for in the intake duct such that subsequent stratification in the form of a concentration gradient in the combustion chamber is obtained so as to achieve combustion with minimum fuel consumption and minimum harmful substance emission.

5. A method according to claim 1, wherein said additional fluid streams cause, in the intake duct, a flow distribution which promotes the mixture of gases before and during the intake stroke.

6. A system for controlling the supply of fluids to an internal combustion engine having an intake duct with an intake valve and an exhaust pipe with an exhaust valve, said system comprising: at least two annular nozzles mounted on said intake duct and each connected to a fluid conduit, a control valve arranged in each of said fluid conduits for controlling fluid flow therethrough, at least one exhaust gas sensor mounted on said exhaust pipe of said internal combustion engine, a central control unit in communication with said exhaust gas sensor for receiving exhaust gas parameters therefrom, said central control unit including a data storage having stored therein an engine-characteristic program for controlling the engine so as to provide minimum fuel consumption and minimum emission of environmentally harmful substances, said control unit further including a comparison and evaluation unit and an actuating device, said comparison and evaluation unit being capable of assigning specific control commands to particular exhaust gas parameters supplied thereto by said exhaust gas sensor which control commands are transmitted to said actuating device for operating said control valves, said annular nozzles having openings oriented in said intake duct so as to allow injection of an additional fluid into said intake duct in a predetermined direction, at least one of said annular nozzles including means for sucking off at least some fluid from said intake duct.

* * * * *